(No Model.) 3 Sheets—Sheet 1.
M. KENNEDY.
WEIGHING SCALE.
No. 317,947. Patented May 12, 1885.
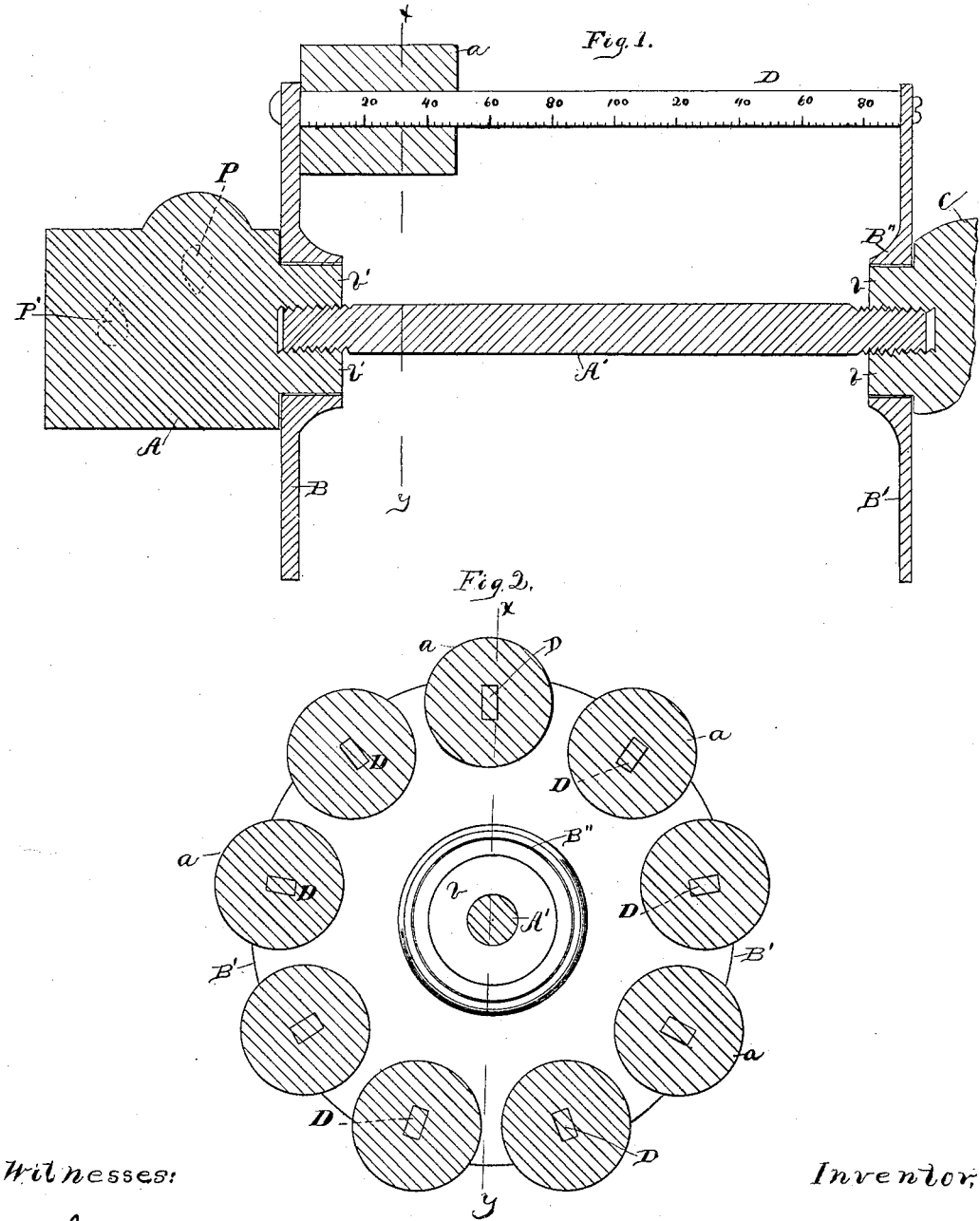
Witnesses:
John T. Booth
J. A. Mosher
Inventor,
Michael Kennedy
by Geo. Anwshu
atty.

(No Model.) 3 Sheets—Sheet 2.

M. KENNEDY.
WEIGHING SCALE.

No. 317,947. Patented May 12, 1885.

Witnesses:
John T. Booth
J. A. Mosher

Inventor.
Michael Kennedy
by Geo. A. Mosher
atty.

(No Model.) 3 Sheets—Sheet 3.

M. KENNEDY.
WEIGHING SCALE.

No. 317,947. Patented May 12, 1885.

Witnesses:
John T. Booth
J. A. Mosher.

Inventor.
Michael Kennedy
by Geo. A. Mosher
Atty.

United States Patent Office.

MICHAEL KENNEDY, OF TROY, NEW YORK.

WEIGHING-SCALE.

SPECIFICATION forming part of Letters Patent No. 317,947, dated May 12, 1885.

Application filed July 22, 1884. (No model.)

*To all whom it may concern:*

Be it known that I, MICHAEL KENNEDY, a resident of the city of Troy, in the county of Rensselaer and State of New York, have invented certain new and useful Improvements in Scales; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in scales.

The objects of my invention are, first, to conveniently weigh and register the weight of a varying load; second, to simplify, cheapen, and reduce the number of parts in a scale-balance.

Figure 3:
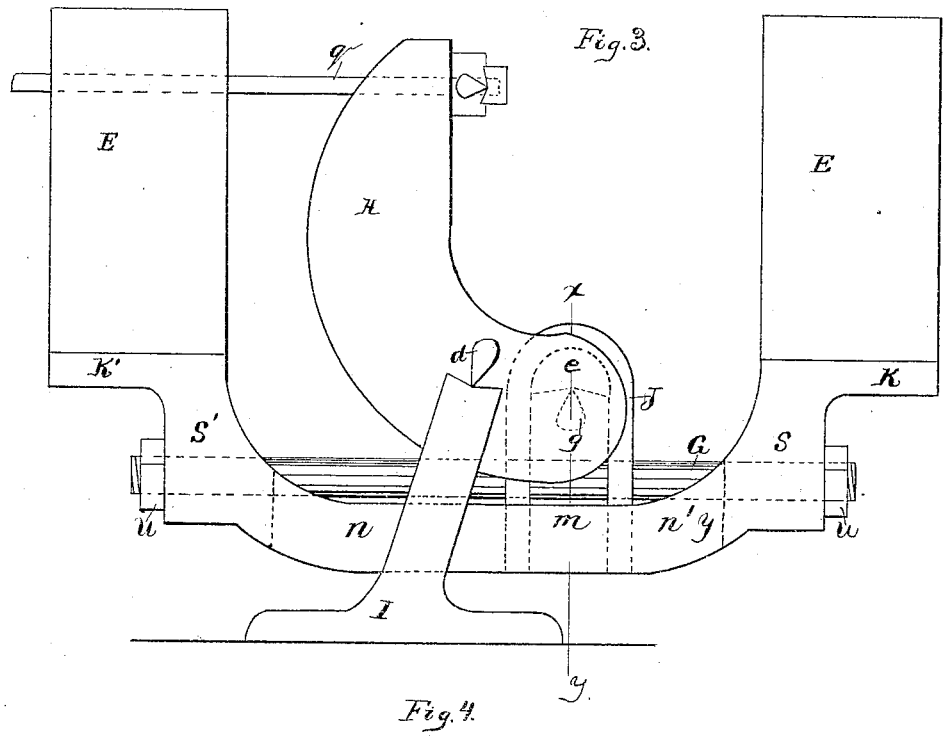
Figure 4:
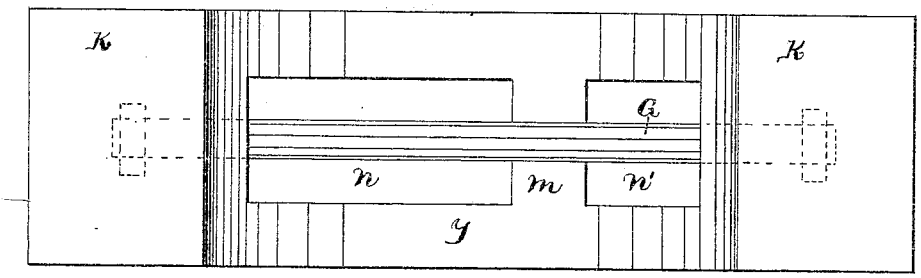
Figure 5:
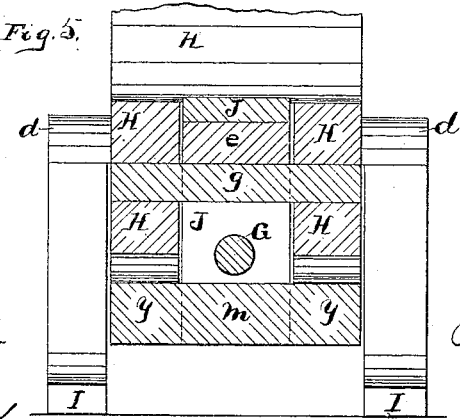
Figure 6:
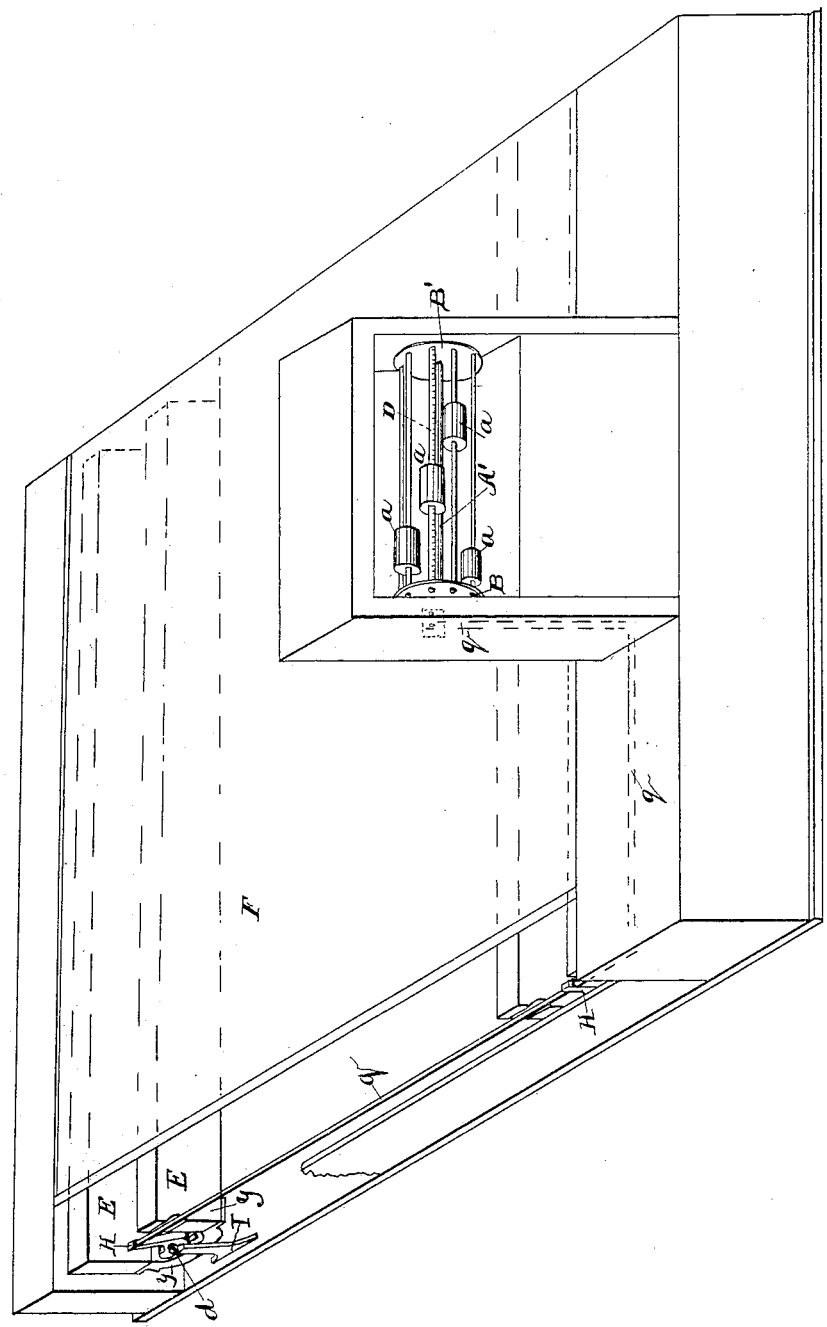

Figure 1 of the drawings is a vertical central section showing a portion of my improved scale-beam, taken at broken line $x\,y$ in Fig. 2. Fig. 2 is a vertical cross-section taken at broken line $x\,y$ in Fig. 1. Fig. 3 is a side elevation of the trussed bottom yoke and connecting parts. Fig. 4 is a top plan view of the yoke. Fig. 5 is a vertical cross-section taken at broken line $x\,y$ in Fig. 3. Fig. 6 is a view, partly perspective and partly isometrical, of my improved scale.

A represents a part of the scale-beam, and C a piece connected therewith by an end-threaded rod or bar, A', which screws into both of them. Piece C is provided with a bearing, b, for the disk B', which turns upon it. Beam A is also provided with the circular bearing b', adapted to receive the circular disk B, and permit of its rotation thereon. The disk B is connected with a similar disk, B', by the connecting-bars D, arranged in a circle near the periphery of each disk, as shown in Figs. 1 and 2. The connecting-rods are each marked with a scale indicating pounds weight, and provided with weights a, adapted to slide one on each of said rods.

The weights a are all slid to the end of their respective rods, so as to rest against the disk B, and the beam then adjusted by weights or otherwise to balance. If, then, we desire to ascertain the weight of several quantities *seriatim* and in the aggregate, it can be easily and quickly accomplished by means of the several graduated bars and sliding weights. For example, if several parties contribute to fill a tank with milk, the tank is first weighed by the weight on any bar D, one party discharges his milk into the tank, and its weight will be correctly indicated on the next bar. Another party now discharges his milk into the tank, the weight of which will be correctly indicated by the sliding weight on third bar D, and so on until all the bars have been used, it only being necessary to rotate the disks to bring the successive bars into convenient view and slide the weights. When the operation is completed, the respective bars give the weights of the respective quantities of milk discharged into the tank, and their sum will be the aggregate amount.

The part C serves as a nut to increase or diminish the friction of the disks upon their bearings $b\,b'$, and prevent any play upon the beam after the balance has been adjusted, as before described.

Platform-scales are constructed with a combination of yokes, bearings, and levers at each of the four corners of the platform, which is rectilineal in form. Fig. 3 shows such a combination for one of the corners, including my improved truss-yoke Y, which supports upon the end platform, K, the platform-supporting beams E, the yoke itself being supported upon pivot $g$ in the lever H, the latter being supported by pivots $d$ bearing upon the upper surface of the bed-plates I.

The yoke Y is preferably made of cast metal with upwardly-inclined ends S S', which are connected by the threaded bolt or rod G, passing through the ends of the yoke and extending longitudinally of the same.

The threaded ends of the bolt are provided each with a nut, $u$, by which the ends of the yoke are prevented from spreading to break the casting. The bolt also passes through the link J, and is sustained thereby, itself sustaining the platform-beams E and scale-platform F.

The link incloses at its upper end the bearing-block $e$, which rests upon the pivot or fulcrum $g$ of lever H. The lower ends of the link project down below the bolt, which passes through it into the openings $n\ n'$, and straddles the cross-bar $m$, which serves to fix and maintain the relative positions of the link and yoke constant.

Heretofore two yokes have been employed—one to support the platform, and the other to bear upon the pivots of lever H, the two yokes being connected by a link at each end.

My improved yoke enables me to dispense with one of said yokes and one of the connecting-links, thereby greatly simplifying and diminishing the number of parts, four of said combination of parts being required—one at each corner of the scale-platform.

In Fig. 6 I have shown the relative position of the several parts, $q$ being the connecting-rod which connects the corner balance with the scale-beam, and indicated partly by dotted lines.

What I claim as new, and desire to secure by Letters Patent, is—

1. The combination of the parts A C, having the bearings $b'\ b$, the revolving disks B B', the scale-bars D, and the slide-weights $a$, all arranged as shown and described.

2. The truss-yoke Y, having the end platforms, K K', and inclines S S', the lever H, having pivot $g$, the block $e$, the bed-plates I, having pivots $d$, the end nutted and threaded bolt G, working in said parts S S', and the link J, in combination with the scale-platform beams E, as and for the purpose specified.

In testimony whereof I have hereunto set my hand this 19th day of July, 1884.

MICHAEL KENNEDY.

Witnesses:
GEO. A. MOSHER,
A. W. WICKES.